United States Patent [19]

Porsche

[11] Patent Number: 4,834,523
[45] Date of Patent: May 30, 1989

[54] EYEGLASSES WITH SEPARABLE RIMS

[75] Inventor: Ferdinand A. Porsche, St. Georgen, Austria

[73] Assignee: Optyl Eyewear Fashion International Corporation, Norwood, N.J.

[21] Appl. No.: 27,009

[22] Filed: Mar. 17, 1987

[51] Int. Cl.$^4$ .............................................. G02C 7/08
[52] U.S. Cl. ...................................... 351/57; 351/63; 351/96; 351/149
[58] Field of Search ............... 351/47, 57, 58, 60, 351/63, 86, 90, 96, 147, 149

[56] References Cited

U.S. PATENT DOCUMENTS

| Des. 276,917 | 12/1984 | Meyerspeer | D16/102 |
|---|---|---|---|
| 1,367,237 | 2/1921 | Carlson | 351/96 |
| 2,444,498 | 7/1948 | Cochran | 351/60 |
| 2,608,904 | 9/1952 | Barrington | 351/149 |
| 2,688,273 | 9/1954 | Markell | 351/149 |
| 3,589,802 | 6/1971 | Amaru | 351/90 |
| 4,176,921 | 12/1979 | Matthias | 351/106 |
| 4,504,127 | 3/1985 | Cottet | 351/86 |
| 4,549,792 | 10/1985 | Dianitsch | 351/63 |

Primary Examiner—Rodney B. Bovernick
Assistant Examiner—P. M. Dzierzynski
Attorney, Agent, or Firm—Fitch, Even, Tabin & Flannery

[57] ABSTRACT

Eyeglasses of a type which permit interchanging of lenses are disclosed which employ a collapsible frame having a pair of hingedly interconnected lens-mounting portions. The lens-mounting portions are configured to engage the peripheral edge of the lens and include several prongs. The peripheral edge of the lenses include prong-receiving recesses which position the lenses relative to the frame to provide secure mounting thereto. The lens-mounting portions of the frame also include a separable connection wherein a mounting lug mounted to one part of the section is received in a socket formed at an end of an opposing section. The separable connection allows the lens-mounting portions to open, facilitating mounting and removal of the lenses, and close so as to provide secure mounting of the lens relative to the frame.

5 Claims, 3 Drawing Sheets

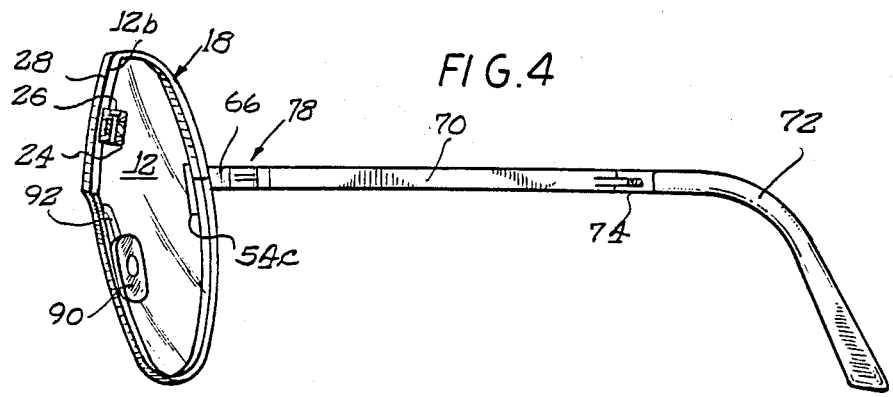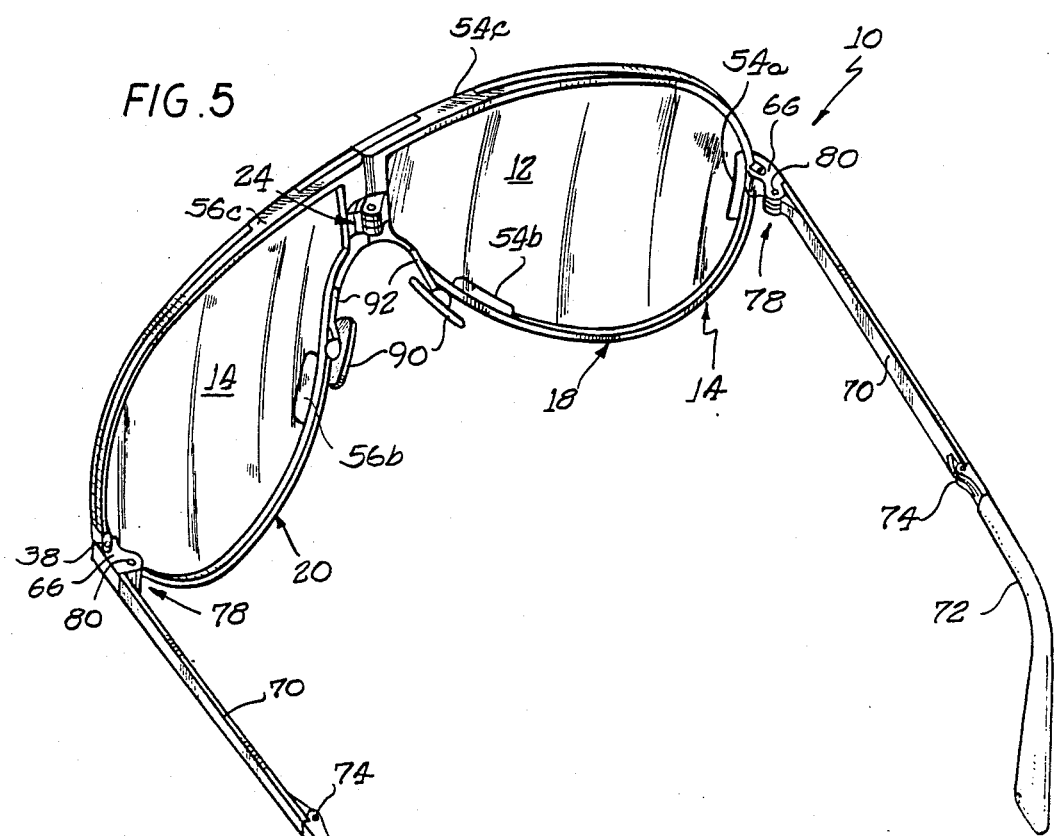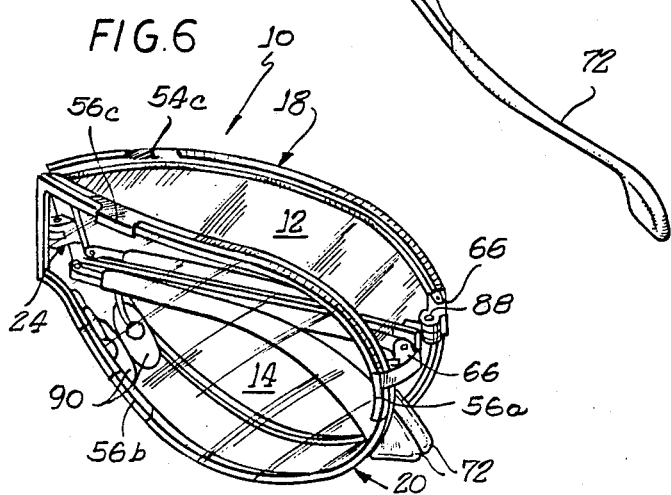

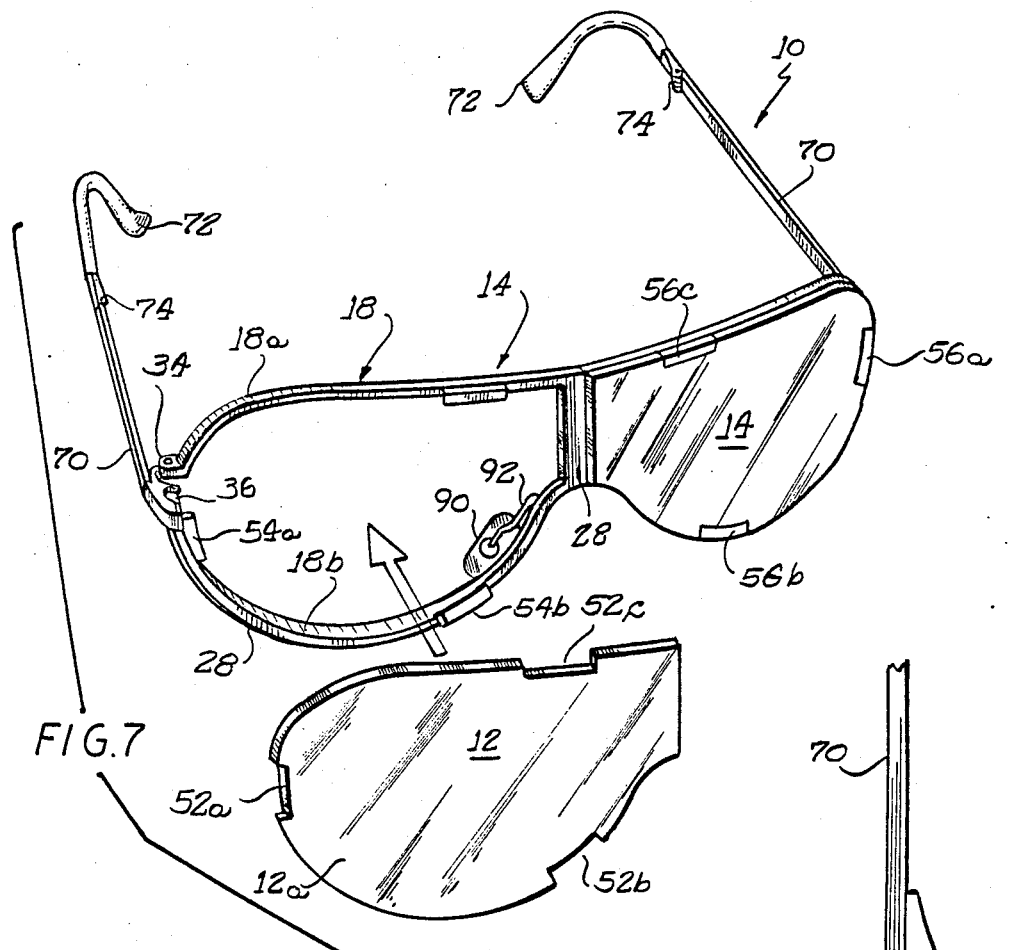
FIG.7
FIG.8
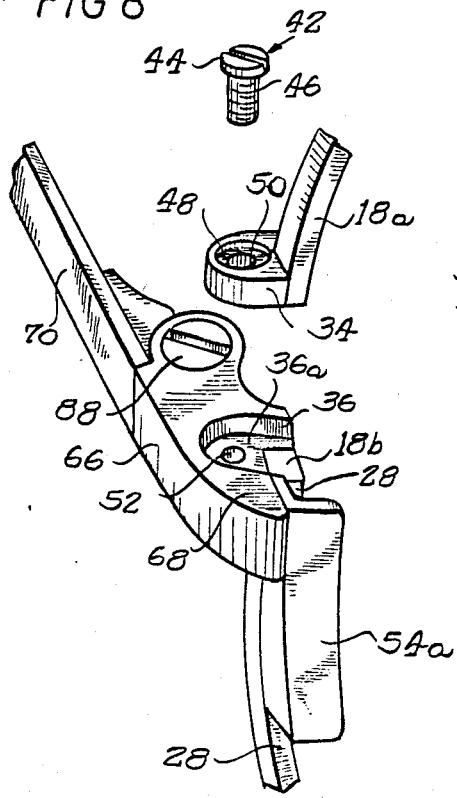
FIG.10
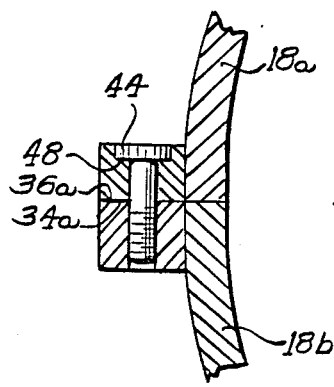
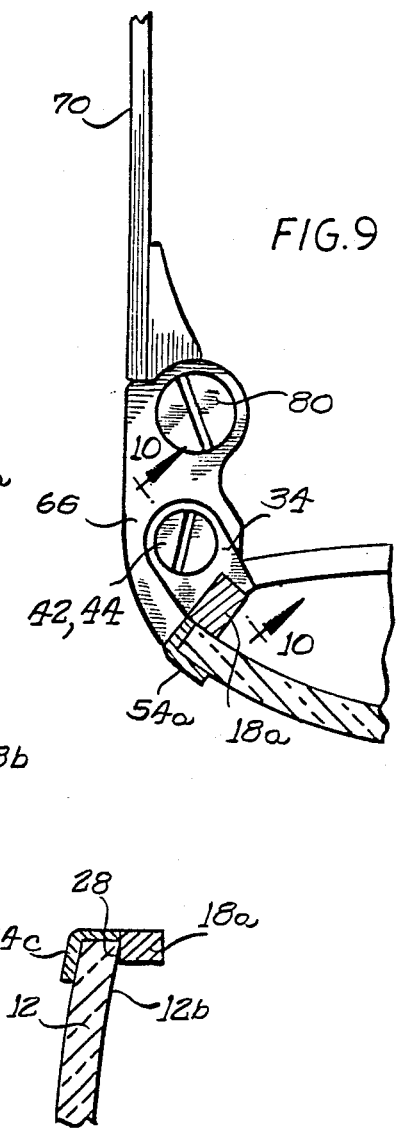
FIG.9
FIG.11

EYEGLASSES WITH SEPARABLE RIMS

This invention relates generally to eyeglasses and, more particularly, to eyeglasses having readily exchangeable lens assemblies.

BACKGROUND OF THE INVENTION

Eyeglasses having exchangeable lenses or lens assemblies offer several advantages over conventional eyeglasses having fixed lenses. For example, in the case of sunglasses, different pairs of lenses can be provided for varying light conditions. Some of these lenses are preferably polarized to protect a wearer's eyes against ultraviolet rays. In the case of prescription glasses, lenses manufactured to the current prescription of the wearer can be easily exchanged for the out-of-date prescription lenses. Also, in the case of lens and/or frame damage, a single component can be replaced more economically than purchasing an entirely new pair of eyeglasses.

Exchangeable lens eyeglasses have been known for some time, but older designs have had significant shortcomings in that they are generally of complex mechanical structure, making them expensive to manufacture. Other designs require substantial mutual deformation of the lens and the front component of the frame, making insertion and removal of a lens cumbersome and difficult.

Recently introduced exchangeable eyeglass designs have overcome these shortcomings by making replacement of the lenses more convenient. In one structure disclosed in U.S. Pat. No. 4,176,921, an eyeglass front is made of wire with complete rims (rims completely encompassing the lenses). Welded to the wire rims are two spaced lower prongs for supporting each lens. An additional prong extends adjacent the temple piece, and is either integral with the rim, or is secured thereto in a welded joinder. The lenses, which may be stored without a frame means until ready for use, are inserted from above until they are embraced by the prongs. A metal lever is hinged to a bridge joining the rims and carries a prong for each lens. The lever is rotated downwardly to a holding position, to secure the lenses to the rims. Separate plastic nose pads are attached to the wire front. The eyeglasses shown in this patent have met with widespread success but they require a relatively expensive wire front, which is typically formed of a wire stock, welded in a separate forming step to form a closed loop. Additional welding steps are required to mount lens-engaging hooks to the closed loop. Also, the metal lever must be formed in a separate step and hingedly connected to the wire front.

Frequently, wearers of sunglasses repeatedly store and retrieve their sunglasses several times during a day, during periods of temporary cloudiness, or when entering and exiting buildings, tunnels, or other areas of greatly reduced ambient lighting. Accordingly, collapsible sunglasses have been provided. Examples are disclosed in U.S. Pat. No. 4,549,792 issued Oct. 29, 1985 and in U.S. Pat. No. Des. 276,917 issued Dec. 25, 1984, which include a collapsible wire frame having multiple hinged joints. Lens-mounting portions completely surrounding each lens are hingedly joined together at a hinged bridge portion. Arm-like temple portions are hingedly connected at one end to the wire frames in a conventional manner, and the other end of the temple pieces, which are adapted to engage the ear of a wearer, are also hinged. In both of these patents, the ear-engaging portions of the temple pieces are hinged for downward movement along a horizontal hinge axis. While both glasses have met with general acceptance because of their ability for collapsible storing, exchange of the lenses of these glasses cannot readily be accomplished by a wearer.

Further, designers of eyeglasses in attempting to create a distinctive appearance, have sought to cover substantially the entire frame with the lens portions.

SUMMARY OF THE INVENTION

It is therefore an object of the present invention to provide collapsible eyeglasses of a simple construction formed from a minimal number of inexpensive components.

It is another object of the present invention to provide collapsible eyeglasses which permit an easy exchange of lenses by a wearer.

Yet another object of the present invention is to provide collapsible eyeglasses of different styles, including styles where the lens portions cover substantially the entire frame.

These and other objects of the present invention which will become apparent from studying the drawings and description herein are provided in eyeglasses of a type which permit an exchange of lenses. Lens means include a body having at least one peripheral edge defining a plurality of recess means. Frame means include a lens mounting section having a plurality of spaced-apart lens-engaging support means at least partially receivable in the recess means so as to mount the lens means to the frame means. The eyeglasses include means cooperative with the frame means to mount the eyeglasses on a wearer in a predetermined relation to the wearer's eyes.

BRIEF DESCRIPTION OF THE DRAWINGS

In the drawings, wherein like elements are referenced alike,

FIG. 4 is a cross-sectional view taken substantially along the Line 4—4 of FIG. 3 and looking in the direction of the arrows;

FIG. 5 is a perspective view of the eyeglasses of the preceding Figures shown in an expanded configuration ready to be worn by a wearer;

FIG. 6 is a perspective view of the eyeglasses of the preceding Figures shown in a collapsed configuration ready for storage by a wearer;

FIG. 7 is an exploded perspective view of the eyeglasses of the preceding Figures showing the exchangeable mounting of the lenses;

FIG. 8 is a fragmentary portion of FIG. 7 showing separable connection of the eyeglass frame in greater detail;

FIG. 9 is a fragmentary top plan view showing the separable connection portion of the frame in greater detail;

FIG. 10 is an elevational cross-sectional view taken substantially along the line 10—10 of FIG. 9 and looking in the direction of the arrows; and FIG. 11 is a partial cross-sectional view of the lens-retaining prong of the eyeglasses of the proceeding Figures, taken substantially along the line 11—11 of FIG. 1 and looking in the direction of the arrows.

DETAILED DESCRIPTION OF THE PREFERRED EMBODIMENT

Figure 1:
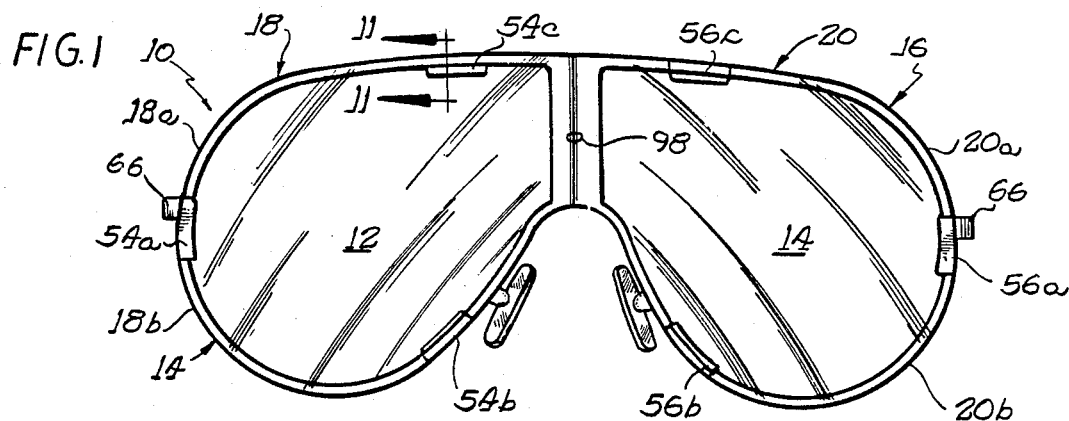
FIG. 1 is a front elevational view of eyeglasses constructed in accordance with a preferred embodiment of the present invention.
Figure 2:
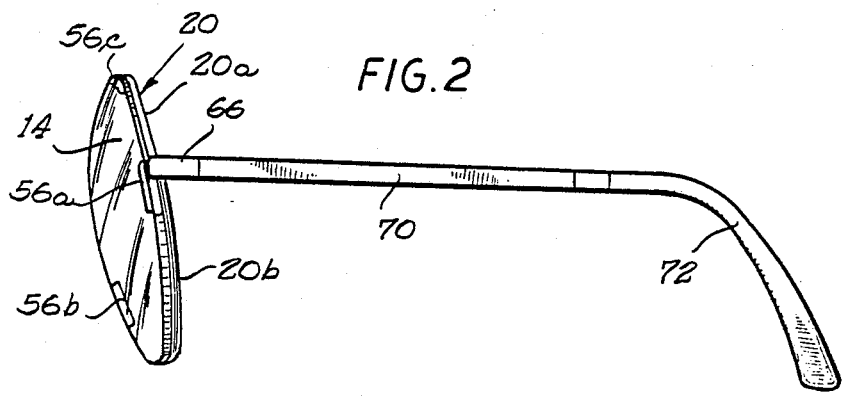
FIG. 2 is a side elevational view of the eyeglasses of FIG. 1.

Referring now to the drawings, collapsible eyeglasses 10 are illustrated having a pair of lenses 12, 14 mounted in a frame 16. As indicated in FIG. 6, eyeglasses 10 have multiple hinged connections so as to be collapsible to a configuration of relatively small volume.

Throughout the following description, the eyeglasses will, for convenience of description, be described with regard to various orientations as positioned on the face of a wearer. The terms include: vertical/horizontal, up/down, left/right, and inner/outer, for example. Such terms are used solely for illustrative purposes, and are not intended for limitation, it being readily understood that other orientations of the invention are possible.

Figure 3:
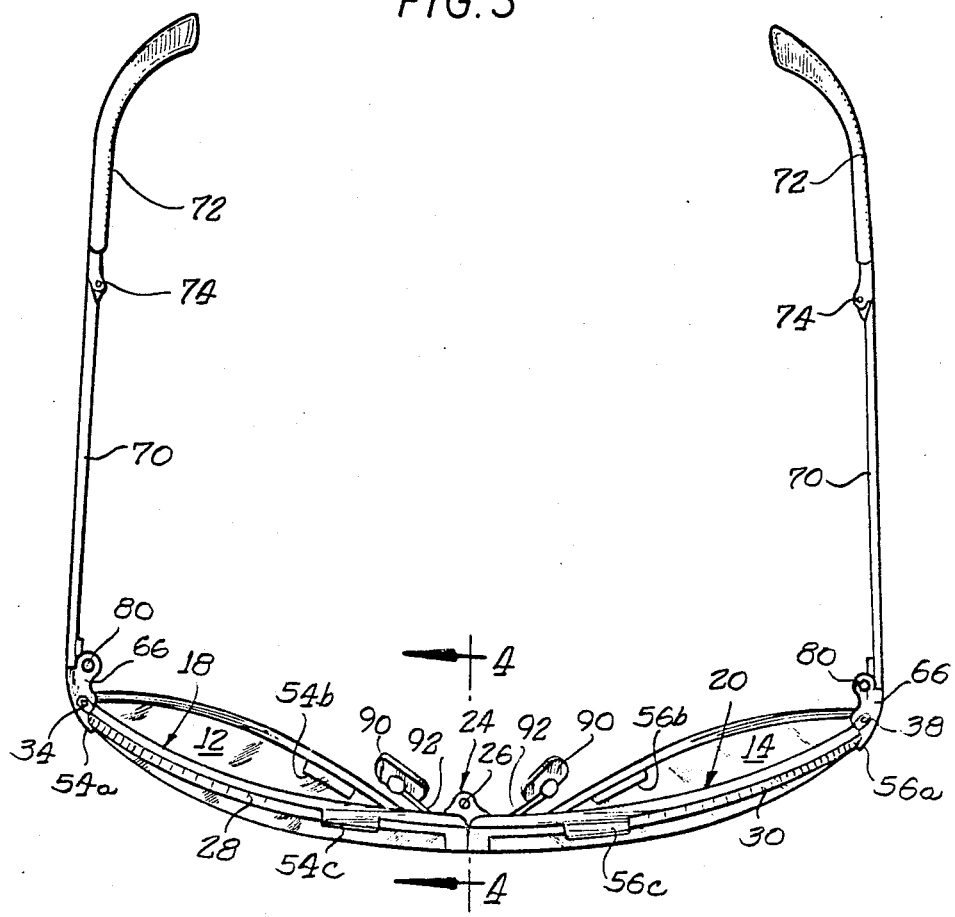
FIG. 3 is a top plan view showing the eyeglasses of the preceding Figures.

Referring to FIGS. 1 and 3, frame 16 can be seen to comprise left and right halves or half portions 18, 20, joined together by a vertically oriented central hinge arrangement 24. Thus, frame 16 comprises a left frame portion 18 and a right frame portion 20. As shown most clearly in the exploded view of FIG. 7, frame portion 18 has a forwardly facing lens-engaging surface 28. The righthand frame portion 20 has a similar forward-facing surface 30, as indicated in FIG. 3. As can be seen in FIGS. 1 and 7, lenses 12, 14 cover substantially the entire forward surface of each lens portion and in so doing cover the entire forward surface of the frame 16 to present a unique, attractive design. Other lens arrangements are, of course, possible and, as will be appreciated, eyeglasses according to the present invention could be constructed to make visible the frame portions surrounding each lens.

A distinctive feature of eyeglasses 10 is that the frame portions 18, 20 each have upper and lower parts designated 18a, 18b and 20a, 20b, respectively. As shown in FIG. 7, and the enlarged detail view of FIG. 8, the upper frame parts carry an outwardly extending mounting lug 34 receivable in a complementary-shaped socket 36 formed in its mating lower part. For example, the left half portion 18 carries a mounting lug 34 receivable in a socket 36 defined at the upper extremity of the lower frame part 18b. The righthand frame portion 20 has a similar, mirror image arrangement. However, only the mounting lug 38 of that arrangement is visible in the drawings.

In the preferred embodiment, frame 16 is constructed from a lightweight metal material which imparts a spring-like quality to the upper and lower frame parts. Other suitable materials for the frame may also be used. However, it is not essential that the upper and lower frame parts have a spring-like quality, this merely being a convenient feature to aid a wearer in exchanging the lenses of the eyeglasses. To overcome any spring-like character the frame parts may have and to maintain a secure engagement between the upper and lower frame parts, a threaded fastener or screw 42 having an enlarged head 44 and a threaded body 46 is employed. As illustrated most clearly in the exploded view of FIG. 8, the enlarged head 44 is received in a recess 48 formed in an upper surface of mounting lug 34 and the threaded body 46 is receivable in an upper enlarged aperture 50 formed in lug 34, and in a threaded aperture 52 formed in lower part 18b. As shown most clearly in FIG. 8, mounting lug 34 has a substantial thickness in the vertical direction compared to its upper and lower surface dimensions. In the preferred embodiment, mounting lug 34 makes a close tolerance fit with its mating socket 36. Due to its relatively significant thickness, mounting lug 34 has a significant locking interengagement with the socket 36 thereby providing an adequate retention between the upper and lower frame parts, while maintaining the desired relative orientation between those two parts. In particular, the substantial thickness of mounting lug 34 contributes to the desired coplanar alignment between upper and lower parts 18a, 18b, for example, to provide a planar configuration matching that of the outer periphery 12a of lens 12. Those skilled in the art will readily appreciate that the orientation between upper and lower frame parts is critical, especially when the mating lens has a complex three-dimensional shape. Also, since socket 36 provides a cup-like retention for the tip of the mounting lug, and cooperates to form a continuous upper surface therewith, there is provided a ready, tactile indication that the screw-receiving apertures 50, 52 have been aligned and that the upper and lower frame parts have been properly oriented.

As indicated, each frame half-portion has three hook-like projections or mounting tabs for engaging, orienting and retaining its mating lens member. As a distinguishing feature over prior art lens-retaining prongs having a minimal lens engagement, the mounting tabs are elongated along the periphery of their respective frame half-portions.

The outer periphery of each lens has a corresponding number of recesses for receiving the mounting tabs. For example, as indicated in FIG. 7, the outer periphery of lefthand lens member 12 has three tab-receiving recesses, 52a through 52c. These recesses engage the respective mounting tabs 54a through 54c formed on the lefthand frame portion 18. As is clearly shown in FIG. 7, the recesses 52a–52c are elongated in a peripheral direction to receive the entire corresponding length of the mating mounting tab. As can be seen in FIG. 1, the inner mounting tabs are vertically aligned, one over the other. For example, the mounting tabs 54b, 55c of the left frame portion 18 are generally aligned along a common vertical line. Similarly, the inner mounting tabs 56b, 56c of the righthand frame portion 20 are, as a mirror-image, generally aligned along another vertical line.

This alignment of inner tabs provides a convenient orientation which facilities installation of a mating lens, as will now be described. Prior to installation of the lefthand lens member 12, for example, screw 42 is removed from the lefthand frame portion 18, and the upper and lower parts 18a, 18b thereof are separated. Lens 12 is then inserted such that its inner end (that overlying the nose of the wearer) is inserted between the inner tabs 54b, 54c. Upon sufficient insertion, the mounting tabs 54b, 54c become fully inserted with their mating recesses 52b, 52c. As the upper and lower parts of frame portion 18 are brought together, the remaining mounting tab 54a is received in its mating recess 52a. The frame portion 18, its mating lens 12 and, more specifically, the mounting tabs and recesses thereof, are configured such that mounting lug 34 will not be properly received in socket 36 (as illustrated in the figures) unless all three tabs are fully received in corresponding recesses on the periphery of lens 12. In general, proper reception of the mounting lug is indicated by complete reception in socket 36 along with the forming of a continuous upper surface with temple mounting part 66. The screw 42 is then inserted in apertures 50 and 52 and is advanced so that its threads engage the threaded interior of lower aperture 52, to provide required locking engagement between upper and lower frame parts as well as locking of lens 12 within frame portion 18. The fully assembled condition thus achieved is indicated in the cross-sectional view of FIG. 10, wherein the bottom surface 34a of lug 34 is mated with the upper surface 36a of socket 36, and screw head 44 is received in its recess 48.

According to another feature of the present invention, lens 12 is maintained in proper, secure alignment against "inward" and "outward" movement, i.e., toward and away from the face of a wearer. As mentioned before, lens portion 18 is provided with a forwardly facing lens engaging surface 28 which engages the periphery of the rear surface 12b of lens 12. This arrangement is indicated in the partial cross-sectional view of FIG. 4 and the enlarged cross-sectional view of FIG. 11. As indicated in FIG. 1, FIG. 11 is a section view taken through the upper, inner mounting tab 54c of the left frame portion 18. As clearly shown in FIG. 11, mounting tab 54c is generally L-shaped in cross-section, having a first leg joined to the upper frame part 18a and a second leg overlying the front surface of lens 12. Thus, in cooperation with upper frame part 18a, mounting tab 54c forms a U-shaped channel for receiving peripheral portions of lens 12 adjacent its recess 52c. The remaining mounting tabs and recesses of eyeglasses 10 have a similar interengaging feature. For example, the same U-shaped channel construction, visible in FIG. 8, is formed by the outer mounting tab 54a, L-shaped in cross-section, cooperates with the lens-engaging surface 28 at the upper terminus of lower part 18.

Referring now to FIGS. 7-10, socket 36 is formed in a relatively massive temple-mounting member 66 located at the upper end of lower frame part 18b. The temple mounting part 66 includes a forwardly-extending projection 68 overlying one leg of the mounting tab 54a, thereby providing a suitable point for or the like joinder thereto as by welding or the like. A similar mating is provided for the lower frame part 18b. As shown in FIG. 8, two of the four external sidewall surfaces of frame part 18b are engaged by the temple-mounting part 66, providing a significant surface area for welded engagement with that frame part. Thus, the fabrication of eyeglasses 10 is improved because of the ready orientation between lower frame part 18b and mounting tab 54a provided by the temple mounting part 66. Further, when assembled by hand, the temple-mounting part 66 provides a visual and tactile indication of the proper alignment of the upper edges of mounting tab 54a and lower mounting part 18b, as indicated in FIG. 8.

Referring especially to FIGS. 4-6, eyeglasses 10 further include a pair of intermediate temple-engaging arms 70 hingedly connected to ear-engaging members 72 with hinge arrangements 74. The forward ends of arm 70 hingedly engage the temple-mounting parts 66 with hinged arrangements 78. The temple-mounting parts 66, seen most clearly in FIG. 4, have a clevis-like portion of hinge 78 for receiving an intermediate hinge plate carried on the forward end of an arm 70. Screws 80 hold hinge arrangements 78 together, having an enlarged head for engaging the upper clevis wall and a threaded tip for threadedly engaging the lower clevis wall. Intermediate portions of the screw provide a bearing surface for the intermediate hinge plate which has an aperture for receiving the screw 80. The hinge connection 74 between arm 70 and ear portion 72 is similar in that a clevis-like hinge portion, carried by ear-engaging part 72, receives an intermediate hinge plate carried by the rearward end of arm 70. Thus, the ear-engaging parts 72 and arms 70 are pivotable in a horizontal plane to assume the collapsed position of FIG. 6. Further, the central hinge arrangement 24 for joining the left and right frame portions 18, 20, together, comprises a similar hinged connection. In particular, hinge arrangement 24 includes a clevis-like hinge portion, carried on the right half-portion 18, for receiving an intermediate hinge plate carried on the left frame portion 20. The hinged arrangement is shown in the cross-section in FIG. 4, which also illustrates the screw 26 holding the hinged connection 24 together.

To further aid in securing the eyeglasses 10 on a face of a wearer, nose pads 90 are connected to the frame half-portions with wire-like connections 92.

As an alternative to the above-described arrangement, the central hinge arrangement 24 can be omitted, with left and right half-portions 18, 20 being joined in an integral frame 16. Although the eyeglasses of this alternative arrangement will not be collapsible as described above, the lenses 12, 14 may now be formed as a single unitary lens having two viewing portions, one for each eye. Other details of the construction described above remain. For example, the alternative unitary lens arrangement will, except for the central line of separation (see FIG. 1), be identical to the combined arrangement of lenses 12, 14 described above. In particular, the same arrangement of recessed portions and cooperating hook-like projections are employed as above to provide the exchange of the unitary lens. As before, the upper frame parts 18a, 20a, are separated to allow the upper mounting tabs 54c, 56c to engage cooperating recesses of the lens. The utility lens is placed into contact with the forward surface portions 28, 30 of the alternative, unitary frame 16. Thereafter, the upper and lower parts 18a, 18b, and 20a, 20b of the frame portions are drawn together, whereupon the lower mounting tabs 54b, 56b are brought into engagement with cooperating recesses of the unitary lens. Also, the laterally outer mounting tabs 54a, 56a are brought into engagement with the laterally outer recesses as the engagement between mounting lugs 34, 38 are brought into engagement with their mating sockets. The same advantages of positioning and securing the lens within the frame 16, as explained above in the collapsible embodiment, are realized in this alternative arrangement.

What is claimed is:

1. Eyeglasses of a type which permit an exchange of lenses, comprising:
    a pair of lenses each including a body having front and rear surfaces and at least one peripheral edge defining a plurality of three-sided spaced apart recess means elongated in the peripheral direction of the lens and extending inwardly from said peripheral edge, between said front and rear surfaces;
    frame means including a pair of lens mounting sections each surrounding a lens and each having rim means engaging a rear surface of one of said lenses and a plurality of hook-like spaced-apart lens-engaging support means cantilevered from said rim means so as to be at least partially receivable in said recess means and having three surfaces, one for engaging each side of a recess means and free ends overlying the lens front surface so as to mount said lenses to said frame means and to prevent unintentional removal of said lenses therefrom, each said rim means extending along a peripheral edge of one of said lenses and including a pair of opposed end portions, each having upper and lower parts and including a socket means carried on one of the upper and lower parts and a complementary-shaped mounting lug on the other of said upper and lower parts, the mounting lug receivable in the socket means to provide a snug interengagement therewith, said lugs and socket means being separable to facilitate positioning of the recess means of the lens adjacent the hook-like lens engaging support means and being connectable to seat the lens engaging support means in respective recesses so as to retain engagement between said lenses and said lens mounting sections; and means cooperative with said frame means to mount the eyeglasses on a wearer in a predetermined relation to the wearer's eyes.

2. The eyeglasses of claim 1 wherein said lens mounting sections are connected together by an intermediate hinge means.

3. The eyeglasses of claim 1 wherein said socket means is defined in a portion of said frame means adjacent the temple of a wearer.

4. The eyeglasses of claim 1 wherein said mounting lug an said socket means include means for receiving a threaded fastener to maintain the engagement between said mounting lug and said socket means.

5. The eyeglasses of claim 1 wherein said lens means includes two lens members each having one said peripheral edge, each peripheral edge including a laterally outer portion adjacent the temple of a wearer and a laterally inner portion adjacent the nose or the wearer, each peripheral edge defining three recess means, one adjacent said outer portion and the other two aligned substantially one above the other adjacent said inner portion.

* * * * *

UNITED STATES PATENT AND TRADEMARK OFFICE
CERTIFICATE OF CORRECTION

PATENT NO. : 4,834,523

DATED : May 30, 1989

INVENTOR(S) : Ferdinand A. Porsche

It is certified that error appears in the above-identified patent and that said Letters Patent is hereby corrected as shown below:

Column 8, line 11, "an" should read --and--.

Column 8, line 18, "or" should read --of- .

Signed and Sealed this

Twenty-fourth Day of April, 1990

Attest:

HARRY F. MANBECK, JR.

*Attesting Officer*  *Commissioner of Patents and Trademarks*